3,403,512
POWER STEERING SYSTEM AND CONTROL VALVE THEREFOR
Thomas J. Malott, Kalamazoo, Mich., assignor to General Signal Corporation, a corporation of New York
Filed Dec. 30, 1966, Ser. No. 606,247
13 Claims. (Cl. 60—52)

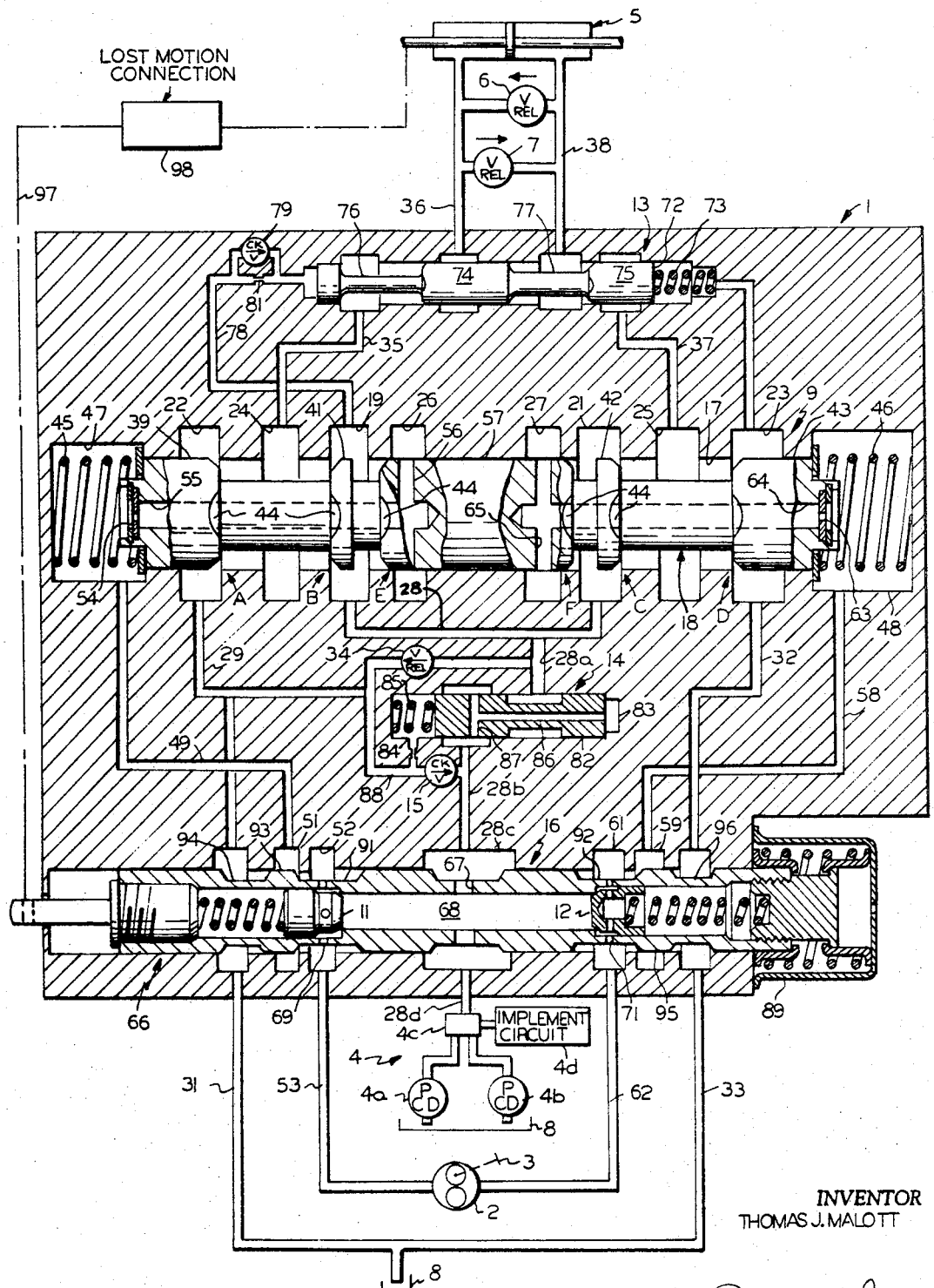

This invention relates to hydraulically operated power steering systems, and to control valves for use therein. It is particularly concerned with steering systems requiring high flow rates, for example flow rates above about 20 gallons per minute.

A common steering system for vehicles includes an engine-driven source of hydraulic fluid under pressure, a double-acting ram for moving the wheels, a small, reversible, positive displacement hand pump which is driven by the operator through the steering wheel, and a steering control valve which is actuated in response to operation of the hand pump and which, among other things, switches the output of the source to the inlet of the hand pump and switches the output of the hand pump to a selected side of the ram. Since all of the fluid delivered to the ram passes through and is metered by the hand pump, this system inherently maintains a proportional relationship between the positions of the ram and the steering wheel. Therefore, there is no need for a feedback link between the ram and the control valve or the hand pump. However, since the hand pump has a small displacement, and its delivery rate is also the rate at which fluid is delivered to the ram, it will be apparent that the number of revolutions of the steering wheel required to move the wheels between their limiting positions will increase directly with the size and stroke of the ram, i.e., with the flow requirements of the installation. In general, the number of turns is considered excessive at a flow rate above about 20 gallons per minute.

An alternate type of prior art steering system also uses a control valve which is operated by the hand pump, but in this case the valve serves to meter flow directly from the source to the ram. While this kind of system acts as a flow amplifier, and thus can handle high flow demands without excessive movement of the steering wheel, all versions of which I am aware have a variable amplification factor or gain and, therefore, require a feedback link of some type in order to maintain correspondence between the movements of the steering wheel and the ram. This characteristic is undesirable, particularly in large acticulated vehicles, because the feedback connections can be complex, and they often include long, slender rods which tend to oscillate and create problems of control stability.

The object of this invention is to provide a power steering system, suitable for use in high flow installations, which does not require any mechanical feedback connection to the ram or the steered parts. This system is characterized by a control valve which is adapted to route a small portion of the output of the source to and through the hand pump, and which serves to meter fluid to the selected side of the ram at a rate which is an essentially constant multiple of the rate of flow through the hand pump. In effect, the control valve is a flow amplifier with a constant gain. Therefore, it can deliver fluid at high flow rates with reasonable steering wheel movement, and it clearly can afford proportional control action without the presence of a mechanical feedback connection.

In its perferred form, the invention also provides mechanism for permitting limited manual steering action through the hand pump at times when the power source is at rest or is disabled. This embodiment also includes a device for hydraulically locking the hand pump and unloading the power source as the wheels approach, but before they actually engage, their mechanical limit stops. This feature provides a cushioned stop for the steered parts and eliminates the shocks which normally are imposed on the vehicle when the wheels are turned to a limiting position. It also prevents the operator from loading the source to the maximum permitted by the system relief valve at a time when the flow demand of the ram is zero.

The preferred embodiment of the invention is described herein with reference to the accompanying drawing whose single figure is a schematic diagram of the improved system.

As shown in the drawing, the improved control valve 1 is incorporated in a steering circuit including a reversible hand pump 2 which is driven by the operator through steering wheel 3, a main source 4 of hydraulic fluid under pressure, a double-acting ram 5 which turns the ground-engaging wheels (not shown, a pair of crisscross relief valves 6 and 7 which relieve the shock loads which may be developed in the opposite sides of ram 5 when the control valve hydraulically locks the ram, and a hydraulic reservoir or tank 8. Source 4, which preferably supplies valve 1 with fluid at a constant rate, comprises a pair of fixed displacement pumps 4a and 4b which are driven by the propulsion engine (not shown), and a regulating valve 4c of the type disclosed in my co-pending application Ser. No. 528,700, filed Feb. 21, 1966. The regulating valve passes to control valve 1 the total output of pump 4a and a portion of the output of pump 4b which varies inversely with engine speed. The excess fluid delivered by pump 4b is diverted to the vehicle's implement circuit 4d.

Before proceeding with the detailed description of control valve 1, it will prove helpful to consider generally the main elements of which it is composed. Control valve 1 comprises three main valving units, the first and most important of which is the metering valve 9 which controls an open center unloading path for source 4, and which meters fluid from source 4 to the left or right end of ram 5 in accordance with the speed and direction of movement of hand pump 2. The second unit includes the check valves 11 and 12 which, in accordance with the teachings in my co-pending application Ser. No. 383,383, filed July 17, 1964, now Patent No. 3,295,551, issued Jan. 3, 1967, act as a switch that automatically connects the output of source 4 with the inlet side of hand pump 2 whenever the hand pump is operated. The third main valving unit is a lock-out valve 13 which serves to hydraulically lock ram 5 when metering valve 9 is in its neutral, open center position, and to open communication between the ram and the metering valve whenever the latter is shifted away from that position. The particular lock-out valve employed in this embodiment is one disclosed in my co-pending application Ser. N. 590,050, filed Oct. 27, 1966. While the switching and lock-out functions performed by valving units 11, 12 and 13 could be assigned to the metering valve 9 itself, the illustrated arrangement is preferred because it results in a smaller deadband for the control valve. In addition to the main valving units, the illustrated control valve 1 also incorporates two optional, auxiliary valving units; the first auxiliary unit comprising cut-off valve 14 and check valve 15 and serving to permit manual steering when source 4 is at rest or is disabled, and the second comprising limit valve 16 which hydraulically locks hand pump 2 and causes metering valve 9 to return to its neutral position just before the ram 5 moves the steered parts of the vehicle into engagement with their mechanical limit stops (not shown).

Turning now to the details of construction and operation, it will be seen from the drawing that metering valve 9 comprises a bore 17 in which reciprocates a metering spool 18, and which is intersected by a pair of supply chambers 19 and 21, a pair of exhaust chambers 22 and 23, a pair of delivery chambers 24 and 25, and a pair of transfer chambers 26 and 27. Supply chambers 19 and 21 communicate with source 4 via a supply path which includes branched passage 28, passages 28a and 28b, chamber 28c, and a supply conduit 28d. Although, as explained later, cut-off valve 14 serves to prevent flow through this supply path under certain operating conditions, for the present it is assumed that this path always is open. Exhaust chambers 22 and 23 are in constant communication with tank 8 through exhaust paths which comprise passage 29 and conduit 31, and passage 32 and conduit 33, respectively. A relief valve 34 interposed between passages 28a and 29 serves to limit the maximum pressure which can be developed in the steering system. The delivery chambers 24 and 25 of valve 9 communicate with the left and right ends, respectively, of ram 5 through a pair of flow paths defined by passage 35 and conduit 36, and by passage 37 and conduit 38, and which are controlled by the lock-out valve 13.

Metering spool 18 is formed with four primary valving lands 39 and 41–43, each of which is provided with a set of circumferentially spaced, inclined metering flats 44 which, with the wall of bore 17, define primary metering orifices A, B, C and D. When spool 18 is in its illustrated neutral position, toward which it is biased by the centering springs 45 and 46, all of the primary orifices are fully open and, therefore, each of the supply chambers 19 and 21 is in essentially free communication with one of the exhaust chambers 22 ad 23. The two parallel flow paths between the supply and exhaust chambers constitute an open center unloading path for source 4. As spool 18 shifts in opposite directions from the neutral position, the flow areas of orifices A and C or orifices B and D are progressively decreased. This has the dual effect of restricting the unloading path and of raising the pressure in one of the delivery chambers 24 and 25. The primary orifices A–D are so shaped that the differential between the pressures in the two delivery chambers varies linearly with movement of spool 18.

Spool 18 is shifted in opposite directions from its neutral position by the differential between the pressures in the control chambers 47 and 48 which act upon its ends. Control chamber 47 normally communicates with one side of hand pump 2 through passage 49, the chambers 51 and 52 of limit valve 16, and conduit 53. This chamber 47 also is connected with supply chamber 19 of metering valve 9 via a pilot path which includes the fixed orifice 54, the axial and radial passages 55 and 56, respectively, formed in spool 18, transfer chamber 26, and a secondary orifice E defined by the inclined flats 44 at the left side of secondary spool land 57. Control chamber 48 normally communicates with the opposite side of hand pump 2 through passage 58, chambers 59 and 61, and conduit 62, and is connected with supply chamber 21 through a similar pilot path including fixed orifice 63, passages 64 and 65, transfer chamber 27 and variable orifice F. When hand pump 2 is at rest, the pressures in chambers 47 and 48 are equal, and springs 45 and 46 hold spool 18 in the neutral position in which the orifices E and F are closed. When the hand pump is actuated, it discharges fluid to one of the supply chambers 19 and 21 through a control chamber 47 or 48 and its associated pilot path and, since each pilot path is restricted, this flow develops a pressure differential between chambers 47 and 48 which shifts spool 18 away from its neutral position. The flats 44 which define each of the secondary orifices E and F are so shaped that the differential between the pressures in control chambers 47 and 48 varies linearly with the discharge rate of pump 2, and the centering springs 45 and 46 are designed to have linear spring rates. Therefore, it should be evident that the distance spool 18 shifts will be a linear function of the discharge rate of hand pump 2. Since the differential between the pressures in the delivery chambers 24 and 25 also varies linearly with movement of spool 18, it follows that the rate at which valve 9 delivers fluid from source 4 to ram 5 will always be a fixed multiple of the discharge rate of hand pump 2, and consequently of the rate of movement of steering wheel 3. This constant gain characteristic of metering valve 9 is an important feature because it insures that the distance ram 5 moves the wheels will depend solely upon the angular displacement of steering wheel 3. As a result, no mechanical feedback connection between the wheels and valve 9 need be provided.

The second main valving unit in control valve 1 serves to switch a portion of the output of source 4 to the inlet side of hand pump 2 whenever the latter is operated. This unit includes the check valves 11 and 12, each of which is located inside the valve spool 66 of limit valve 16 in a flow path extending between the chamber 28c of the main supply path and the hand pump 2; one path comprising passages 67, 68 and 69 formed in spool 66, chamber 52 and conduit 53, and the other path comprising the passages 67, 68 and 71 formed in spool 66, chamber 61 and conduit 62. The check valves 11 and 12 are biased closed, and one or the other of them is opened by the pressure differential between the supply path and the inlet of hand pump 2 when that pump is operated. The switching function performed by check valves 11 and 12 is not affected in any way by operation of limit valve 16, and it will be understood that they are incorporated in the spool 66 merely as a matter of manufacturing convenience.

The lock-out valve 13, which constitutes the third main valving unit in control valve 1, includes a two-position spool 72 which serves to open and close connections between the delivery passages 35 and 37 of metering valve 9 and the conduits 36 and 38, respectively, leading to the left and right ends of ram 5. Spool 72 is biased by a spring 73 to its closed position, in which lands 74 and 75 block these connections and hydraulically lock ram 5, and is shifted to the open position, in which the connections are completed through the spool grooves 76 and 77, by the differential between the pressures in the main supply and exhaust paths of valve 1 which are applied to its opposite ends. Spring 73 is so sized that the pressure differential required to shift spool 72 to its open position is slightly higher, for example 30 p.s.i. higher, than the pressure differential which exists between the supply and exhaust paths where metering spool 18 is in its neutral position. The pressure in the supply path is transmitted to the left end of spool 72 from supply chamber 19 via a passage 78 containing a one-way flow restrictor in the form of a check valve 79 and a restricted by-pass passage 81. As explained in co-pending application Ser. No. 590,050 this type of flow restrictor retards closing movement of spool 72 and eliminates the shocks which are created in cases where the lock spool closes immediately upon movement of the metering valve to its neutral position.

Although the functions performed by the three main valving units have already been described individually, a fuller understanding of the invention will be obtained by considering these functions in the context of a complete steering cycle. For purposes of the following discussion of operation, it is assumed that the cut-off valve 14 always interconnects supply passages 28a and 28b, and that limit valve 16 always connects passages 49 and 58 with the conduits 53 and 62, respectively, leading to the opposite sides of hand pump 2.

With the hand pump 2 at rest, the pressures in control chambers 47 and 48 are equal, so centering springs 45 and 46 hold metering spool 18 in the illustrated neutral position, and check valves 11 and 12 remain closed. Therefore, all of the oil supplied to control valve 1 by source 4 flows to the supply chambers 19 and 21 through conduit 28d, chamber 28c and passages 28b, 28a and 28, and then returns to tank 8 through the open center unloading path defined by orifices B and A, exhaust chamber 22 and exhaust passage 29, and by orifices C and D, exhaust chamber 23 and exhaust passage 32. Since, at this time, the primary orifices A–D are fully open, the backpressure in the supply chambers 19 and 21 will be only slightly higher than the pressure in exhaust chambers 22 and 23. Because of this, spring 73 of lock-out valve 13 will hold spool 72 in its closed position, and ram 5 will be hydraulically locked. As a result, small road shocks will not cause changes in the vehicle's direction of travel.

In order to turn the vehicle to the right, the operator rotates steering wheel 3 in a direction that causes hand pump 2 to withdraw fluid from conduit 62 and to discharge it to conduit 53. This action reduces the pressure in conduit 62, chambers 61 and 59, passage 58 and control chamber 48, and raises the pressure in conduit 53, chambers 52 and 51, passage 49 and control chamber 47. Therefore, check valve 12 will open to transmit a small portion of the output of source 4 to the inlet of hand pump 2, and metering spool 18 of valving unit 9 will shift to the right. Movement of spool 18 in this direction reduces the flow areas of primary orifices A and C, and thereby restricts the open center unloading path and raises the pressure in the main supply path. This increases the pressure differential to which lock-out valve 13 responds, and consequently lock spool 72 immediately moves to its open position. Simultaneously, movement of spool 18 opens secondary orifice E. Since the control circuit, including hand pump 2 and the control chambers 47 and 48, is in communication with the supply path through the open check valve 12, and its pressure level increases with the rise in pressure in the supply path, the fluid delivered to control chamber 47 through hand pump 2 now flows through passages 55 and 56, transfer chamber 26 and orifice E to supply chamber 19, where it rejoins the much larger direct flow from the supply path. Depending upon the position of spool 18, some or all of the fluid delivered to supply chamber 19 now passes to the left end of ram 5 via orifice B, chamber 24, passage 35, spool groove 76 and conduit 36. As the ram commences to move the wheels, the oil displaced from its right end is returned to tank 8 through conduit 38, spool groove 77, passage 37, delivery chamber 25, orifice D, chamber 23 and the exhaust path previously described.

Ram 5 will move the wheels at a rate which is directly proportional to the rate of rotation of steering wheel 3 since all of the oil delivered to the ram, whether directly from source 4 or indirectly through hand pump 2, is metered by primary orifices A and C and, as explained above, these orifices create a pressure differential between delivery chambers 24 and 25 which is a linear function of the rate of movement of steering wheel 3. Inasmuch as the gain of valve 9 is substantially constant, the distance ram 5 moves the wheels depends solely upon how far steering wheel 3 is displaced.

When steering wheel 3 is brought to rest, the pressures in control chambers 47 and 48 will equalize, and springs 45 and 46 will return valve spool 18 to its illustrated neutral position. At this time, check valve 12 will close. After a short time delay, which depends on the flow restriction afforded by restrictor 81, the spool 72 of lock-out valve 13 will shift to its closed position, and again hydraulically lock ram 5.

In order to execute a left turn, the operator rotates steering wheel 3 in a direction which causes hand pump 2 to discharge oil to conduit 62. Now, check valve 11 opens, the pressure in control chamber 48 rises above the pressure in control chamber 47, and metering spool 18 shifts to the left from the illustrated position. This movement of spool 18 reduces the flow areas of orifices B and D, and thus restricts the open center path and raises the pressure in delivery chamber 25, and increases the flow area of secondary orifice F to reduce the restriction to flow from control chamber 48 to supply chamber 21. After lock-out spool 72 shifts to its open position, fluid under pressure in chamber 25 will be delivered to the right end of ram 5, and the opposite end will be vented to tank 8 through delivery chamber 24. As in the case of a right turn, the wheels will move at a speed and through an angle which are directly proportional to the rate and extent of movement, respectively, of steering wheel 3. When steering wheel 3 again comes to rest, valve spool 18 will return to its neutral position, and check valve 11 and lock-out valve 13 will close.

At times when source 4 either is at rest or has been rendered incapable of delivering oil under pressure to control valve 1, it is desirable to provide for manual steering solely through hand pump 2. Cut-off valve 14 and check valve 15 are provided for this purpose. Cut-off valve 14 includes a spool 82 which is interposed between the passages 28a and 28b of the main supply path of valve 1, and is shiftable between open and closed positions by the differential between the pressures in the chambers 83 and 84 at its opposite ends, and by a compression spring 85. Chamber 83 is in continuous communication with passage 28b through axial and radial passages 86 and 87 formed in spool 82, and chamber 84 is in continuous communication with one of the exhaust paths of control valve 1. Check valve 15 is interposed in a passage 88 extending between passage 28b and one of the exhaust paths, and is oriented to permit flow toward, but not away from, the main supply path.

During normal operation, i.e., when source 4 is delivering oil to valve 1, the pressure dicerential between passage 28b and the exhaust paths of control valve 1 is sufficient to keep cut-off spool 82 in its open position and to maintain check valve 15 closed, even when metering valve 9 is in its neutral, open center position. Therefore, valves 14 and 15 play no part in a normal steering cycle. However, as soon as source 4 ceases to supply oil to valve 1, the pressures in chambers 83 and 84 will equalize, and spring 85 will shift cut-off spool 82 to its closed position. If the operator should now turn the steering wheel, hand pump 2 will tend to evacuate that portion of the main supply path ahead of cut-off valve 14 and thereby reduce the pressure in passage 28b below the pressure in the exhaust path. As a result, check valve 15 will open and deliver fluid from tank 8 to the inlet side of hand pump 2 through one of the other of the check valves 11 and 12. The oil discharged by hand pump 2 passes to supply chamber 19 or 21 through one of the pilot paths described earlier, thereby causing the metering spool 18 to shift away from neutral position and reduce the flow areas of either the orifices A and C or the orifices B and D. Since cut-off valve 14 is closed, and consequently short circuiting of hand pump 2 is now precluded, the pressure in the supply chambers 19 and 21 will rise, and lock-out valve 13 will open. As a result, the oil displaced by hand pump 2 is now forced into one side of ram 5. Although the rate of flow to the ram will be small, and the steering action will be far from the optimum, nevertheless the operator will be able to control the direction of travel of the vehicle. When the operator brings steering wheel 3 to rest, metering spool 18 will return to its neutral position, and valves 13, 15 and the then open check valve 11 or 12 will close.

In installations, such as articulated vehicles, where the mass of the steered parts moved by ram 5 is large and the operator is seated on one of these parts, annoying and sometimes dangerous jolts can be produced if the ram is permitted to move the steered parts against their mechanical limit stops. It is the function of secondary limit valve 16 to eliminate this condition by disabling the hydraulic actuating system just before the ram or the steered parts reach the limit of their travel in either direction. The limit valve 16 includes a three-position spool 66 having a neutral position, toward which it is biased by centering spring 89, and in which its grooves 91 and 92 complete the connections between the control passages 49 and 58, respectively, and the hand pump 2; a right limiting position in which land 93 blocks flow from hand pump 2 to control passage 49, groove 94 connects this passage with exhaust conduit 31, and groove 92 maintains open the connection between passage 58 and hand pump 2; and a left limiting position in which land 95 blocks flow from hand pump 2 to control passage 58, groove 96 connects this passage with exhaust conduit 33, and groove 91 connects control passage 49 with hand pump 2. Spool valve 66 is shifted to its limiting positions by ram 5 through a mechanical linkage 97, which usually takes the form of a push-pull cable and which includes a lost motion connection 98. This connection 98 is so designed that ram 5 shifts valve spool 66 to the right and left limiting positions just prior to contact between the steered parts and the right and left limit stops, respectively.

When the ram 5 and the steered parts are within the range of lost motion afforded by connection 98, centering spring 89 maintains limit spool 66 in the illustrated neutral position. Consequently, the control circuit interconnecting hand pump 2 and the control chambers 47 and 48 is complete, and the system operates in the manner described above. However, when the steered parts approach one of the mechanical limit stops, linkage 97 becomes effective to shift spool 66 to one or the other of its limiting positions. If this happens as the wheels are being turned to the right, spool 66 is moved to its right limiting position to thereby cause land 93 to block flow from conduit 53, and cause groove 94 to connect control chamber 47 to tank 8. Closure of conduit 53 hydraulically locks hand pump 2 against further movement in its current direction of travel and thus indicates to the operator that the steered parts have been moved full stroke. Simultaneously, venting of control chamber 47 equalizes the pressures acting on opposite ends of metering spool 18 and allows centering springs 45 and 46 to return this spool to its neutral, open center position. As a result, lock valve 13 closes, and source 4 is unloaded. Since, under these conditions, groove 92 of limit spool 66 maintains open the connection between conduit 62 and control chamber 48, the hand pump 2 can be operated in the opposite direction to initiate movement of the wheels to the left in the normal way. Similar results are produced when the steered parts approach the left limit stop, but in this case limit spool 66 is moved to its left limiting position, and land 95 and groove 96 become effective to hydraulically lock hand pump 2 and vent control chamber 48, respectively. It should be evident that the limit valve 13 will perform the same functions in cases where source 4 is at rest or is disabled and the vehicle is being steered manually solely through hand pump 2.

As stated previously, the drawing and description relate only to the preferred embodiment of the invention. Since the structure of this embodiment can take various different forms, all of which will be obvious to those skilled in the art, without departing from the inventive concept, the following claims should provide the sole measure of the scope of the invention.

What I claim is:
1. A control valve comprising
  (a) inlet and exhaust passages, first and second control passages, and first and second motor passages;
  (b) metering valve means including first and second delivery passages and having a neutral position in which it establishes a pair of unloading paths between the inlet and exhaust passages, each of which includes one of said delivery passages, the metering valve means being movable in a first direction from the neutral position to progressively restrict communication between the inlet passage and the first delivery passage and between the second delivery passage and the exhaust passage, and being movable in a second, opposite direction from the neutral position to progressively restrict communication between the inlet passage and the second delivery passage and between the first delivery passage and the exhaust passage;
  (c) lock valve means responsive to movement of the metering valve means and serving to isolate each motor passage from the other passages when the metering valve means is in neutral position and to connect the first and second motor passages with the first and second delivery passages, respectively, when the metering valve means moves away from neutral position in either direction;
  (d) switch valve means for selectively connecting the inlet passage with the first and second control passages when the metering valve means moves in said first and second directions, respectively;
  (e) first and second pilot passages connecting the first and second control passages, respectively, with the first and second delivery passages;
  (f) first and second variable area control orifices in said first and second pilot passages, respectively, and controlled by the position of the metering valve means, the orifices being arranged so that each is closed when the metering valve means is in neutral position, the first is opened progressively as the metering valve means moves in said second direction, and the second is opened progressively as the metering valve means moves in said first direction;
  (g) spring means biasing the metering valve means to its neutral position; and
  (h) actuating means responsive to the pressures in the two control passages for shifting the metering valve means in said first direction as the pressure in the second control passage rises above the pressure in the first control passage, and for shifting the metering valve means in the opposite direction as the pressure in the first control passage rises above the pressure in the second control passage.

2. A control valve as defined in claim 1 in which the switch valve means comprises a pair of check valves separate from the metering valve means and located in passages connecting the inlet passage with each of the control passages, the check valves being oriented to permit flow away from, but not toward, the inlet passage.

3. A control valve as defined in claim 2 in which the lock valve means comprises
  (a) a valving members separate from the metering valve means and shiftable between closed and open positions in which, respectively, it performs said isolating and connecting functions;
  (b) means biasing the valving member toward its closed position; and
  (c) means responsive to the differential between the pressures in the inlet and exhaust passages for shifting the valving member to the open position.

4. A control valve as defined in claim 1 in which
  (a) each control passage has two portions, namely a first portion with which the switch valve means is connected, and a second portion which is connected to one of said pilot passages and which contains the pressure to which said actuating means responds; and
  (b) which includes a limit valve having a neutral position in which it interconnects the two portions of the first control passage and also interconnects the two portions of the second control passage, a second position in which it connects the second portion of the first control passage with the exhaust passage, blocks flow from the first portion of that control passage, and interconnects the first and second portions of the second control passage, and a third position in which it connects the second portion of the second control passage with the exhaust passage, blocks flow from the first portion of that passage, and interconnects the two portions of the first control passage.

5. A control valve as defined in claim 1 in which
  (a) the inlet passage has two portions, namely an upstream portion which is connected to the switch valve means, and a downstream portion which is connected to the metering valve means; and (b) which includes
  (1) a check valve interposed in a passage connecting said upstream portion with the exhaust passage and oriented to permit flow toward, but not from, said upstream portion,
  (2) a cut-off valve interposed between the two portions of the inlet passage and shiftable between open and closed positions in which, respectively, it interconnects said portions and isolates them from each other,
  (3) means biasing the cut-off valve closed, and
  (4) means responsive to a differential between the pressures in said upstream portion and in the exhaust passage for shifting the cut-off valve to open position.

6. A control valve as defined in claim 1 in which the metering valve means comprises
  (a) a valve bore containing a reciprocable spool provided with lands which cooperate with the wall of the bore to define said first and second control orifices and also four primary metering orifices, the first and third primary metering orifices being interposed between the inlet passage and the first and second delivery passages, respectively, and the second and fourth primary metering orifices being interposed between the exhaust passage and the first and second delivery passages, respectively,
  (b) the primary metering orifices being so arranged that all are open when the spool is in neutral, that the first and fourth are closed progressively when the spool moves in said first direction, and that the second and third are closed progressively when the spool moves in said second direction.

7. A control valve as defined in claim 6 in which
  (a) the four primary metering orifices are so shaped that they produce a pressure differential between the delivery passages which is a linear function of spool movement when the sum of the flows through the inlet and pilot passages is constant;
  (b) the first and second control orifices are so shaped that each produces a differential between the pressures in the associated control and delivery passages which is a linear function of the rate of flow through the associated pilot passage; and
  (c) the spring means has a linear rate.

8. A control valve as defined in claim 1 in which the metering valve means comprises
  (a) a valve bore intersected by eight longitudinally spaced flow chambers, there being first and second transfer chambers, first and second exhaust chambers located at opposite sides of the transfer chambers and forming part of the exhaust passage, first and second delivery chambers located between the first transfer and exhaust chambers and between the second transfer and exhaust chambers, respectively, and forming part of said first and second delivery passages, and first and second inlet chambers located between the first transfer and delivery chambers and between the second transfer and delivery chambers, respectively, and forming part of said inlet passage; and
  (b) a valve spool reciprocable in the valve bore and provided with lands which cooperate with the wall of the bore to define
    (1) first and third primary metering orifices located, respectively, between the first inlet and first delivery chambers and between the second inlet and second delivery chambers,
    (2) second and fourth primary metering orifices located, respectively, between the first delivery and exhaust chambers and between the second delivery and exhaust chambers, and
    (3) said first and second control orifices located, respectively, between the first transfer and inlet chambers and between the second transfer and inlet chambers,
  (c) the opposite ends of the spool being within portions of the first and second control passages and serving as said actuating means.

9. In combination
  (a) a double-acting motor having opposed working chambers;
  (b) a source of hydraulic fluid, and a hydraulic reservoir;
  (c) a reversible, positive displacement, manually operable control pump having first and second ports each of which may serve as the discharge port while the other is serving as the inlet port;
  (d) a metering valve connected with the source and the reservoir and having a neutral position in which it connects the source with the reservoir through a pair of parallel unloading paths, one path including in series a first primary metering orifice, a first delivery passage and a second primary metering orifice, and the other path including in series a third primary metering orifice, a second delivery passage, and a fourth primary metering orifice, the metering valve being movable in a first direction from the neutral position to close progressively the first and fourth primary orifices, and being movable in a second, opposite direction from the neutral position to close progressively the second and third primary metering orifices;
  (e) first and second control chambers connected with the first and second ports of the control pump by first and second control passages, respectively;
  (f) switch valve means for selectively connecting the source with the first and second ports of the control pump as the metering valve moves away from neutral position in said first and second directions, respectively;
  (g) lock valve means responsive to movement of the metering valve and serving to hydraulically lock the motor when the metering valve is in its neutral position and to connect the opposed working chambers of the motor with said first and second delivery passages, respectively, when the metering valve moves away from neutral position in either direction;
  (h) first and second pilot passages connecting the first and second control chambers with the first and second delivery passages, respectively, and each containing a secondary control orifice whose flow area varies with movement of the metering valve, the secondary orifices being arranged so that both are closed when the metering valve is in neutral position, the one in the first pilot passage is opened progressively as the metering valve moves in said second direction from neutral position, and the one in the second pilot passage is opened progressively as the metering valve moves in said first direction from neutral position;
  (i) centering spring means biasing the metering valve toward the neutral position; and
  (j) actuating means responsive to a differential between the pressures in the control chambers for shifting the metering valve in said first direction as the pressure in the second chamber rises above the pressure in the first, and for shifting the metering valve in said second direction as the pressure in the first chamber rises above the pressure in the second.

10. The combination defined in claim 9 wherein
  (a) the source delivers fluid at a substantially constant rate;
  (b) the primary orifices are so shaped that the differential between the pressures in the two delivery passages varies linearly with movement of the metering valve;
  (c) the centering spring means has a linear rate; and
  (d) the secondary orifices are so shaped that the differential between the pressures in the associated control chamber and delivery passage varies linearly with the rate of flow through the associated pilot passage.

11. The combination defined in claim 9 wherein
(a) the switch valve means comprises a pair of check valves located in passages connecting the source with the ports of the control pump and oriented to permit flow from the source to either port but not in the reverse directions; and
(b) the lock valve means comprises a valving member separate from the metering valve and which is shiftable between closed and open positions in which, respectively, it performs said locking and connecting functions, means biasing the valving member toward closed position, and means responsive to a differential between the pressures in the connections between the metering valve and the source and reservoir for shifting the valving member to the open position.

12. The combination defined in claim 9 which includes a limit valve which is operated by the motor and which blocks flow from the first port of the control pump and vents the first control chamber to the reservoir when the motor reaches a predetermined position in one direction of movement, and which blocks flow from the second port of the control pump and vents the second control chamber to the reservoir when the motor reaches a predetermined position in its opposite direction of movement.

13. The combination defined in claim 9 which includes
(a) pressure responsive valve means for permitting flow from the reservoir to either port of the control pump when the pressure at the port decreases below the pressure in the reservoir; and
(b) pressure responsive cut-off valve means for preventing flow from the delivery passages to either port of the control pump through the switch valve means when the pressure at the port decreases below the pressure in the reservoir.

No references cited.

EDGAR W. GEOGHEGAN, *Primary Examiner.*